(12) United States Patent
Shoji

(10) Patent No.: US 6,542,563 B1
(45) Date of Patent: Apr. 1, 2003

(54) RECEPTION METHOD AND RECEIVER FOR DIGITAL RADIO COMMUNICATION SYSTEM

(75) Inventor: Takanori Shoji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/196,786

(22) Filed: Nov. 20, 1998

(30) Foreign Application Priority Data

May 22, 1998 (JP) .......................................... 10-141867

(51) Int. Cl.[7] .............................. H04J 3/06; H04J 3/14
(52) U.S. Cl. ...................... 375/366; 375/368; 370/510; 370/513; 370/514
(58) Field of Search ................................ 375/365, 366, 375/367, 368; 370/509, 510, 511, 512, 513, 514, 515

(56) References Cited

U.S. PATENT DOCUMENTS

| 4,943,985 A | | 7/1990 | Gherardi | |
|---|---|---|---|---|
| 5,251,239 A | | 10/1993 | Turban et al. | |
| 5,550,833 A | * | 8/1996 | Fujisawa | 370/514 |
| 5,619,507 A | * | 4/1997 | Tsuda | 370/350 |
| 5,646,947 A | * | 7/1997 | Cooper et al. | 370/510 |
| 5,715,284 A | | 2/1998 | Shoji et al. | |
| 5,898,743 A | * | 4/1999 | Shoji et al. | 370/514 |
| 6,108,380 A | * | 8/2000 | Miyaji et al. | 375/240 |
| 6,172,978 B1 | * | 1/2001 | Fushimi et al. | 370/395 |
| 6,278,718 B1 | * | 8/2001 | Eschholz | 370/503 |

FOREIGN PATENT DOCUMENTS

| JP | 9247114 | 9/1997 |
|---|---|---|
| JP | 9247115 | 9/1997 |

\* cited by examiner

Primary Examiner—Young T. Tse
(74) Attorney, Agent, or Firm—Rothwell, Figg, Ernst & Manbeck

(57) ABSTRACT

In order to obtain a digital radio communication receiver having a preferable frame-structure decision probability, a frame synchronization state is decided in accordance with separately detected frame-synchronization synchronous words and a frame-structure is decided in accordance with a frame-structure synchronous word and to output the frame synchronization state and the frame structure.

5 Claims, 9 Drawing Sheets

| $\varepsilon$ | p | f | CURRENTLY RECEIVING ch | | CURRENTLY RECEIVING NORMAL | |
|---|---|---|---|---|---|---|
| | | | MISSING ch | FALSELY DETECTING ch AS NORMAL | MISSING NORMAL | FALSELY DETECTING NORMAL AS ch |
| 0 | 5.61E-01 | 2.33E-10 | 8.07E-01 | 7.15E-20 | 9.15E-01 | 7.75E-02 |
| 1 | 3.29E-01 | 7.68E-09 | 5.50E-01 | 1.19E-16 | 6.98E-01 | 2.39E-02 |
| 2 | 1.78E-01 | 1.23E-07 | 3.24E-01 | 3.73E-14 | 4.45E-01 | 4.64E-03 |
| 3 | 9.66E-02 | 1.28E-06 | 1.84E-01 | 4.44E-12 | 2.63E-01 | 8.14E-04 |
| 4 | 5.19E-02 | 9.65E-06 | 1.01E-01 | 2.65E-10 | 1.48E-01 | 1.33E-04 |
| 5 | 2.75E-02 | 5.65E-05 | 5.45E-02 | 9.31E-09 | 8.03E-02 | 2.02E-05 |
| 6 | 1.49E-02 | 2.68E-04 | 3.06E-02 | 2.12E-07 | 4.40E-02 | 3.26E-06 |
| 7 | 8.00E-03 | 1.05E-03 | 2.01E-02 | 3.28E-06 | 2.38E-02 | 5.08E-07 |
| 8 | 4.28E-03 | 3.50E-03 | 2.23E-02 | 3.65E-05 | 1.28E-02 | 7.81E-08 |
| 9 | 2.31E-03 | 1.00E-02 | 4.38E-02 | 2.96E-04 | 6.91E-03 | 1.23E-08 |
| 10 | 1.23E-03 | 2.51E-02 | 9.89E-02 | 1.84E-03 | 3.69E-03 | 1.86E-09 |
| 11 | 6.44E-04 | 5.51E-02 | 2.04E-01 | 8.60E-03 | 1.93E-03 | 2.67E-10 |
| 12 | 3.34E-04 | 1.08E-01 | 3.67E-01 | 3.12E-02 | 1.00E-03 | 3.72E-11 |

IN FIG.8,
SYMBOL $\varepsilon$ DENOTES A SYNCHRONOUS WORD CORRELATIVE THRESHOLD,
p DENOTES A PROBABILITY OF MISSED SYNCHRONOUS WORDS,
f DENOTES A PROBABILITY OF FALSELY DETECTED SYNCHRONOUS WORDS, NORMAL DENOTES A FIRST FRAME STRUCTURE, AND ch DENOTES A SECOND FRAME STRUCTURE.

FIG. 8 CONVENTIONAL ART

RECEPTION METHOD AND RECEIVER FOR DIGITAL RADIO COMMUNICATION SYSTEM

BACKGROUND OF THE INVENTION

1. Field of the Invention

The present invention relates to a digital radio communication receiver for deciding synchronous words used for decision of received frame synchronization and decision of received frame structure in accordance with correlative thresholds different from each other.

2. Description of the Prior Art

Generally, in the case of digital radio communication, a received bit series is detected by detecting a received signal and received information is correctly extracted by detecting the frame timing in the received bit series. Detection of frame timing and frame synchronization are performed by detecting a bit series having a sharp autocorrelation set to a predetermined position in a frame, that is, by detecting a synchronous word. The synchronous word is also referred to as Sync word or Unique word. Moreover, in figures, a synchronous word is shown as UW that is the abbreviation of Unique word.

A synchronous word is detected by comparing a received bit series with a synchronous word bit series prepared at the reception side. When the number of mismatched bits of the received bit series and the synchronous word bit series is equal to or less than a correlative threshold serving as a predetermined threshold, it is decided that a synchronous word is detected. However, when the number of mismatched bits exceeds the correlative threshold at the timing at which a synchronous word should be originally present, it is decided that synchronous word is false detected.

When frame synchronization is established, it is possible to approximately estimate the position of a synchronous word in a receiver. Therefore, when frame synchronization is established, the false detection probability of synchronous words can be lowered by setting a gate referred to as aperture and detecting an effective synchronous word at the position of the synchronous word or only in a small range around the position.

Frame synchronization is established by detecting synchronous words at a predetermined position continuously by a specified number of frames. This operation is referred to as backward protection and the specified number of frames is referred to as the number of backward protection stages. As the number of stages increases, false frame synchronization does not easily occur and therefore, the reliability of frame synchronization is improved. However, it takes a lot of time until frame synchronization is established. However, when the number of stages decreases, it takes only a short time until frame synchronization is established. However, false frame synchronization easily occurs.

Frame step-out is detected when synchronous words are missed continuously by a specified number of frames at a position at which a synchronous word should be originally present. This operation is referred to as forward protection and the specified number of frames is referred to as the number of forward protection stages. As the number of stages increases, it takes a lot of time to detect frame step-out due to deterioration of circuit quality. Conversely, as the number of stages decreases, it takes only a short time to detect frame step-out. However, the probability of erroneously deciding frame step-out is raised when frame synchronization should be originally held.

Moreover, in the case of a digital radio communication system, frame structures may be changed depending on the communication state. For example, in the case of a system using the voice actuation art, a frame is transmitted only when a voice is significant but no frame is transmitted in principle when no voice is recognized. Even in this case, however, a short burst including a synchronous word is transmitted every certain interval in order to hold frame synchronization. However, the interval is generally different from a frame length.

As described above, when frame structures are changed depending on the communication state, it is necessary that the transmission side communicates the change of frame structures. To communicate the change of frame structures, there is a method of previously setting a bit series for communicating a frame structure in a frame and moreover, there is a method of inserting a bit series for communicating change of frame structures (hereafter referred to as frame structure flag). Moreover, at the reception side, there are a method of detecting a frame structure flag and a method of deciding a frame. structure every synchronous-word detection interval.

FIG. 4 is a block diagram showing the structure of a section for estimating frame synchronization and frame structure of the digital radio communication receiver disclosed in the Japanese Patent Laid-Open publication No. 247114/1997. In FIG. 4, reference numeral 1' denotes a synchronous word detecting section, 2 denotes an aperture control section, 3 denotes a timing control section, 4 denotes a number-of-frame-synchronization protection stage setting section, 5 denotes a frame synchronization deciding section, 6 denotes an aperture width setting section, 7' denotes a correlative threshold setting section, 8 denotes a received signal extracting section, 9 denotes a frame structure deciding section, 100 denotes an antenna, 101 denotes a down converter, and 102 denotes a wave detector.

Then, operations of the conventional example in FIG. 4 are described below. The down converter 101 converts a carrier wave received from the antenna 100 into an intermediate frequency band and the wave detector 102 demodulates a signal received from the intermediate frequency band to output it as a received bit series. The synchronous word detecting section 1' receiving the received bit string takes the correlation between received bit series and synchronous words in accordance with the timing information sent from the aperture control section 2, performs detection of a synchronous word and decision of a phase in accordance with the number of error bits and the correlative threshold sent from the correlative threshold setting section 7, and outputs the decision results to the timing control section 3, frame synchronization deciding section 5, frame structure deciding section 9, aperture width setting section 6, and correlative threshold setting section 7 as synchronous word detecting information. The timing control section 3 outputs the received timing formation used to next perform synchronous word detection to the aperture control section 2 and received signal extracting section 8 in accordance with the synchronous word detecting information. The frame synchronization deciding section 5 decides a frame synchronous state using the number of forward protection stages serving as the continuous detection frequency of the synchronous word detecting information designated by the number of frame-synchronization protection stages 4 and the number of backward protection stages serving as the number of continuous misses, and outputs the decision result to the aperture width setting section 6 and correlative threshold setting section 7 as frame synchronization deciding information.

The aperture width setting section 6 sets an aperture width serving as a time width used to next perform synchronous word detection by using the synchronous word detecting information and frame synchronization information and outputs the aperture width to the aperture control section 2. The correlative threshold setting section 7 sets a correlative threshold serving as a synchronous word detecting condition used to next perform synchronous word detection by using the synchronous word detecting information and frame synchronization information and outputs the correlative threshold to the synchronous word detecting section 1. The received signal extracting section 8 extracts a received signal from a received bit series in accordance with received timing information. The frame structure deciding section 9 decides a frame structure in accordance with the detection interval of the synchronous word detecting information and outputs the decision result as frame structure deciding information.

Then, recognition of a frame structure for performing frame synchronization control by the above digital radio communication receiver is described below by referring to FIG. 5. FIG. 5 shows a state in which frame structures are changed depending on the communication state. A part of FIG. 5 is shown by extracting FIG. 3 in "RADIO TRANSMISSION IN THE AMERICAN MOBILE SATELLITE SYSTEM", A COLLECTION OF TECHNICAL PAPERS, AIAA-94-0945-CP, pp. 280–294 (1994) and simplifying FIG. 3.

In FIG. 5, reference numeral 23 denotes a synchronous word. 24 denotes a first frame structure flag showing a first frame structure, which is inserted when a second frame structure changes to the first frame structure. 25 denotes a second frame structure flag showing a second frame structure, which is inserted when the first frame structure changes to the second frame structure. The frame structure includes the following two types: the first frame structure having a synchronous word every subframe and the second frame structure having a synchronous word every frame. Moreover, the frame structure deciding section 9 shown in FIG. 4 decides the first frame structure when detecting a synchronous word at a specified interval in which the first frame structure flag 24 or the first frame structure can be recognized and decides the second frame structure when detecting a synchronous word at a specified interval in which the second frame structure flag 24 or the second frame structure can be recognized.

FIGS. 6 and 7 are illustrations showing examples of recognizing the frame structure in FIG. 4. FIG. 6 shows a case in which the received first frame structure is falsely detected as the second frame structure. FIG. 7 shows a case in which the received second frame structure is falsely detected as the first frame structure. In this case, it is assumed that the first frame structure serving as a continuous frame and the second frame structure serving as a channel activity burst for transmitting a synchronous word every four frames are present. Moreover, when a synchronous word is detected for three consecutive frames, it is decided that the first frame structure is recognized. When a synchronous word is detected only at a one-frame interval, it is decided that the second frame structure is recognized.

FIG. 8 is a chart showing the relation between correlative thresholds used for synchronous word decision results and probabilities of missed and falsely-detected frame structure decision results so as to examine the probability causing the erroneous decisions shown in FIGS. 6 and 7. In the case of FIG. 8, when assuming that the received frame synchronization state is synchronous state and the value of a correlative threshold is 6, the probability of missed synchronous words is $1.49 \times 10^{-2}$ and the probability of falsely-detected synchronous words is $2.68 \times 10^{-4}$. When a received frame structure is the second frame structure, the probability of not deciding the second frame structure as the second frame structure which cannot be detected is $3.06 \times 10^{-2}$ and the probability of falsely deciding the second frame structure as the first frame structure is $2.12 \times 10^{-7}$. When a received frame structure is the first frame structure, the probability not capable of detecting the first frame structure is $4.40 \times 10^{-2}$ and the probability of falsely deciding the second frame structure as the first frame structure is $3.26 \times 10^{-6}$.

FIG. 9 is an illustration obtained by graphing the values in FIG. 8. From FIG. 9, it is found that using a correlative threshold for minimizing the probability of missed frame structures is more proper for frame structure decision because the probabilities of falsely-detected frame structures shown by E and G are considerably low compared to the probabilities of missed frame structures shown by D and F. Moreover, by considering the first and second frame structures, it is estimated that a correlative threshold of 7 to 8 is proper. However, because a correlative threshold is used to decide frame synchronization in the case of the conventional example, it is impossible to obtain a correlative threshold of 7 to 8 that is suitable for a frame structure.

A conventional digital radio communication receiver is constituted as described above and the synchronous word detecting information detected by the synchronous word detecting section 1' is directly used for the frame synchronization deciding section 5 and frame structure deciding section 9. Therefore, there is a problem that it is impossible to optimize a frame synchronization probability and frame structure decision probability.

SUMMARY OF THE INVENTION

The present invention is made to solve the above problem and its object is to provide a reception method and a receiver of a digital radio communication system, capable of improving a frame synchronization probability and a frame structure decision probability.

According to one aspect of the invention, a reception method for a digital radio communication system includes the steps of directly detecting a frame-synchronization synchronous word from a received bit series, directly detecting a frame-structure synchronous word from the received bit series, deciding a frame synchronous state in accordance with the frame-synchronization frame synchronous word, deciding a frame structure in accordance with the frame-structure synchronous word, and outputting each decision result.

According to another aspect of the invention, a reception method for a digital radio communication system includes the steps of separately detecting a plurality of different types of frame-structure synchronous words, directly from the same received bit series of a digital radio communication signal, deciding a plurality of different types of frame-structures in accordance with the frame-structure synchronous words, and outputting each decision result.

According to yet another aspect of the claimed invention, a receiver for a digital radio communication system having two types of frame structures is provided, wherein a frame-synchronization synchronous word is decided from a received bit series, a first frame structure synchronous word is decided from the same received bit series, first and second correlative thresholds are set for determining the frame synchronization and frame structure decisions, and frame synchronization and frame-structure deciding circuits detect received frames and frame-structures in accordance with the frame-synchronization and frame-structure synchronous word detection information.

BRIEF DESCRIPTION OF THE DRAWINGS

FIG. 8 is an illustration showing a synchronous-word correlative threshold, probability of missed frame structure, and probability of falsely detected frame structures of the above conventional receiver.

DETAILED DESCRIPTION OF THE PREFERRED EMBODIMENTS

Embodiment 1

Figure 1:
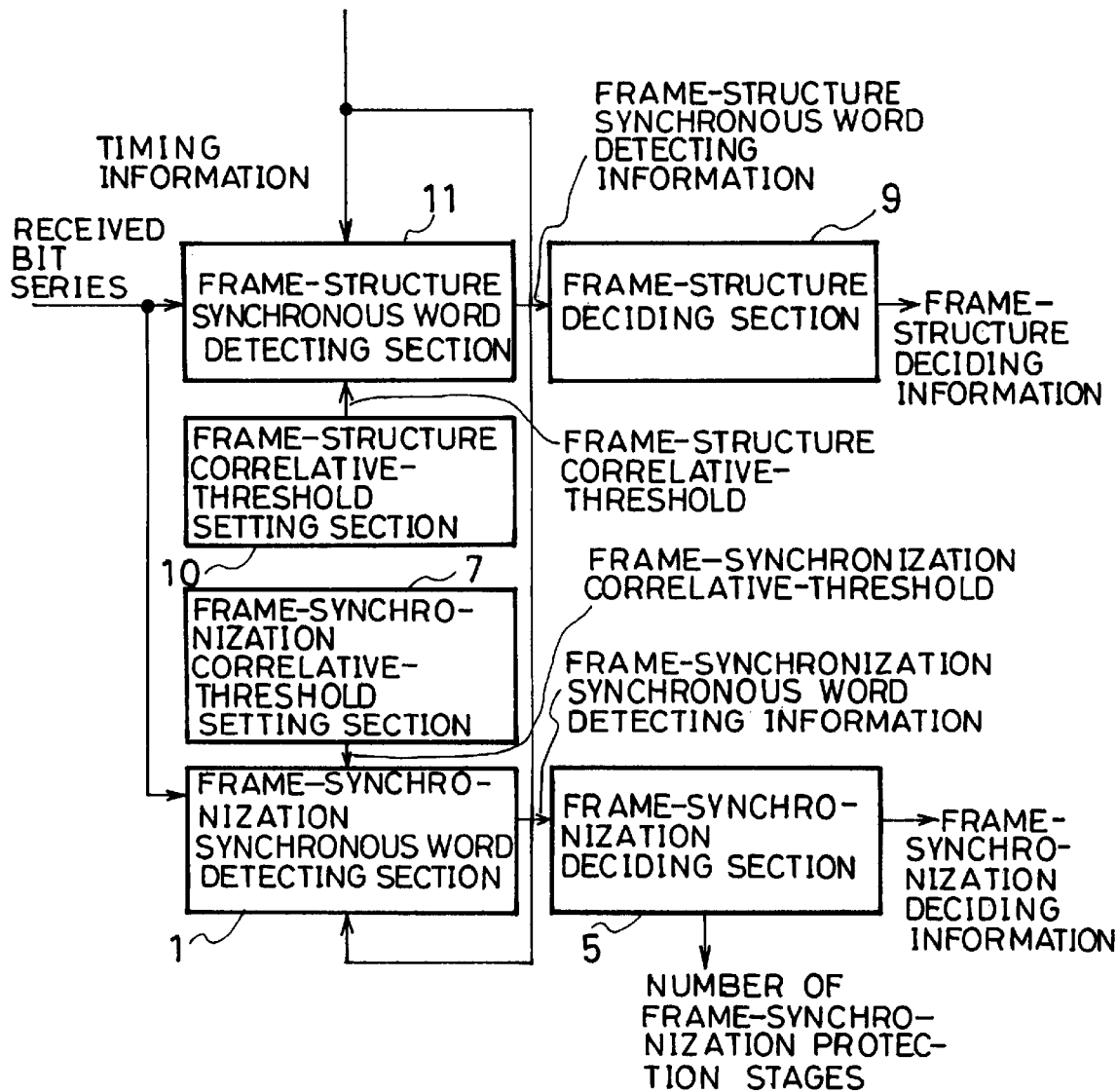
FIG. 1 is a block diagram showing embodiment 1 of the present invention.
Figure 4:
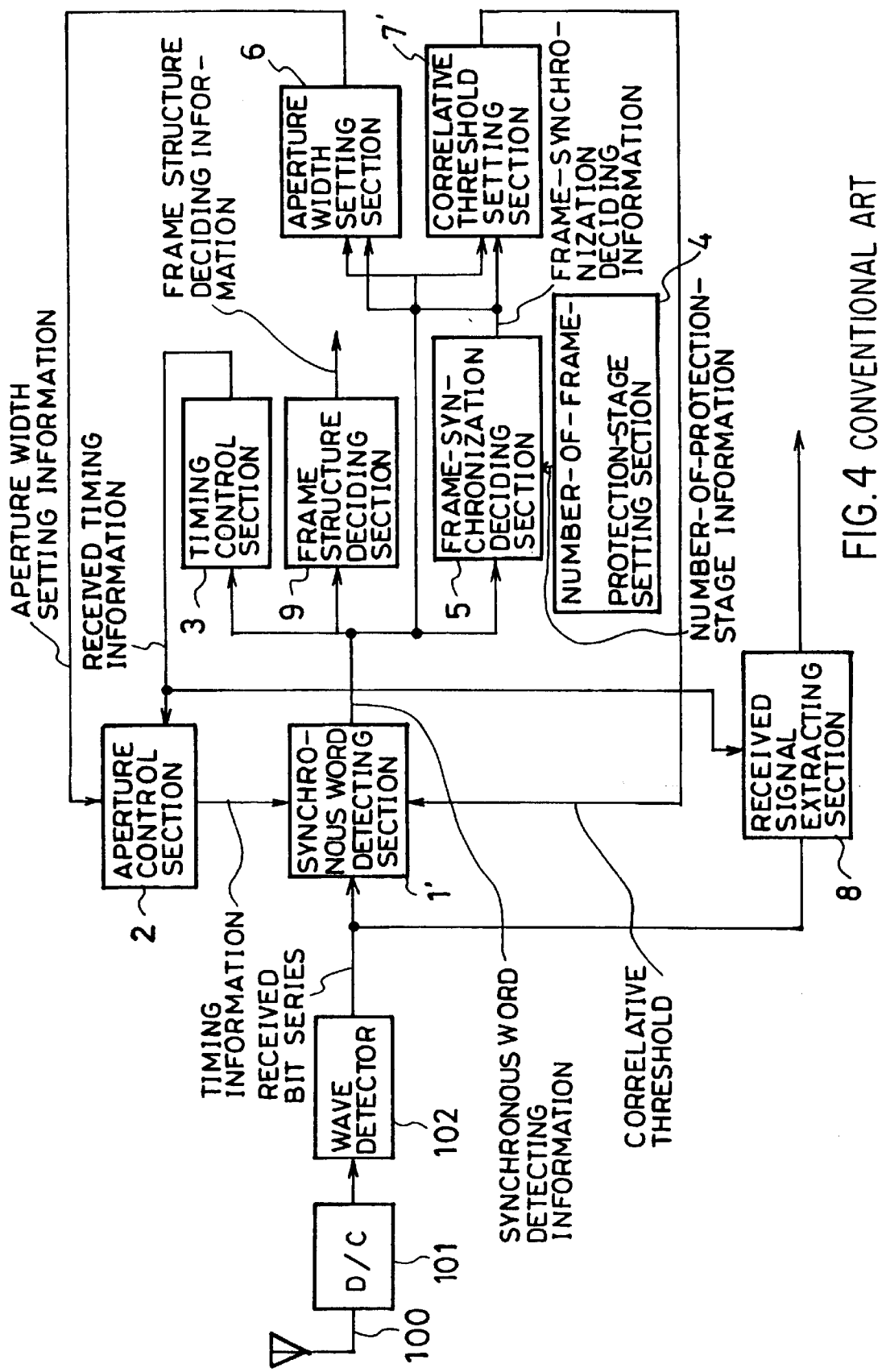
FIG. 4 is a block diagram of a conventional digital radio communication receiver.
Figure 5:
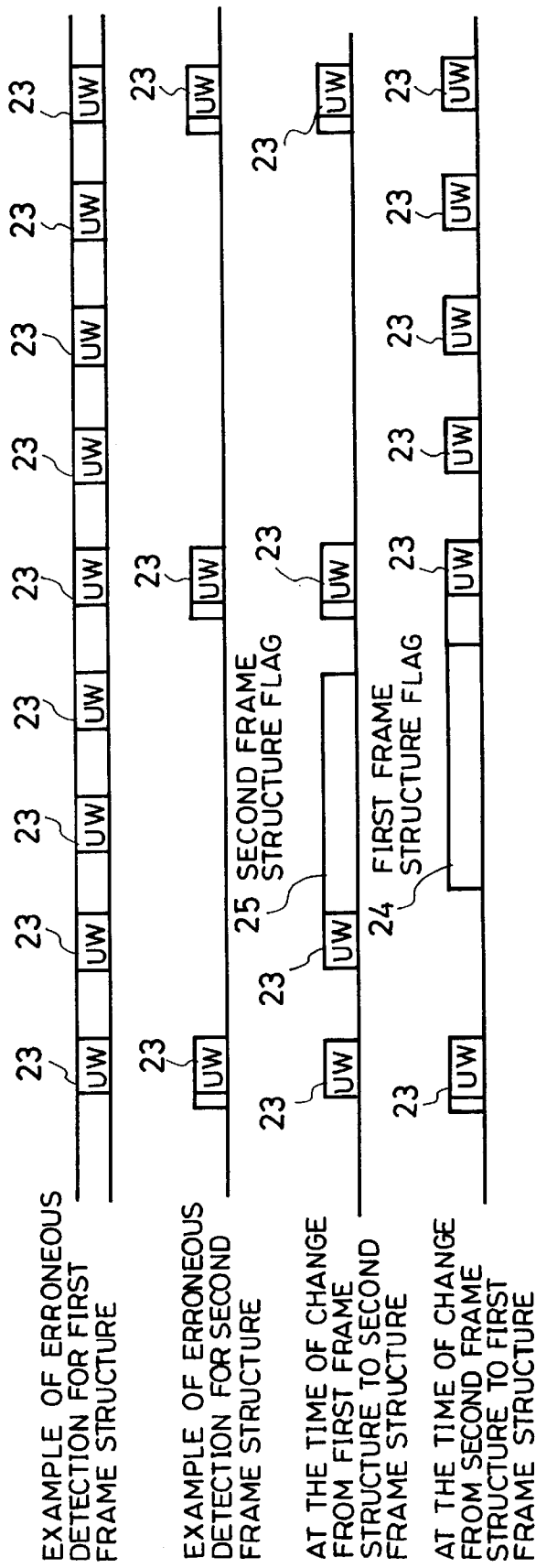
FIG. 5 is an illustration showing an example of constituting a frame and burst of the above conventional receiver.
Figure 6:
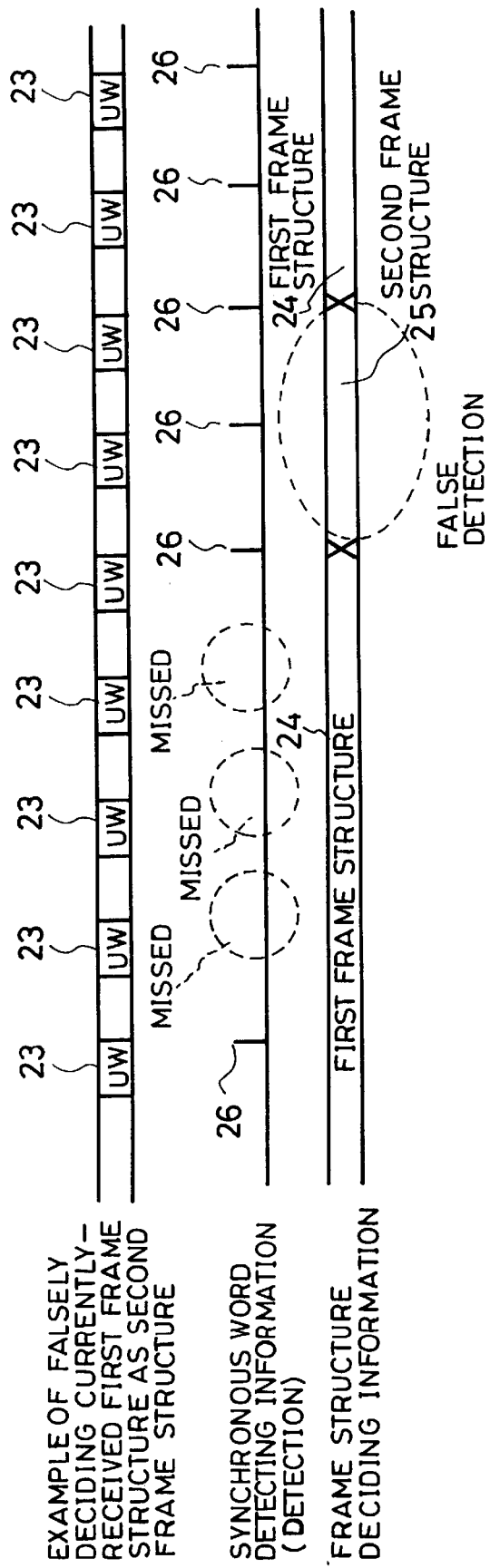
FIG. 6 is an illustration showing a case of falsely detecting a first frame structure of the above conventional receiver as a second frame structure of the receiver.
Figure 7:
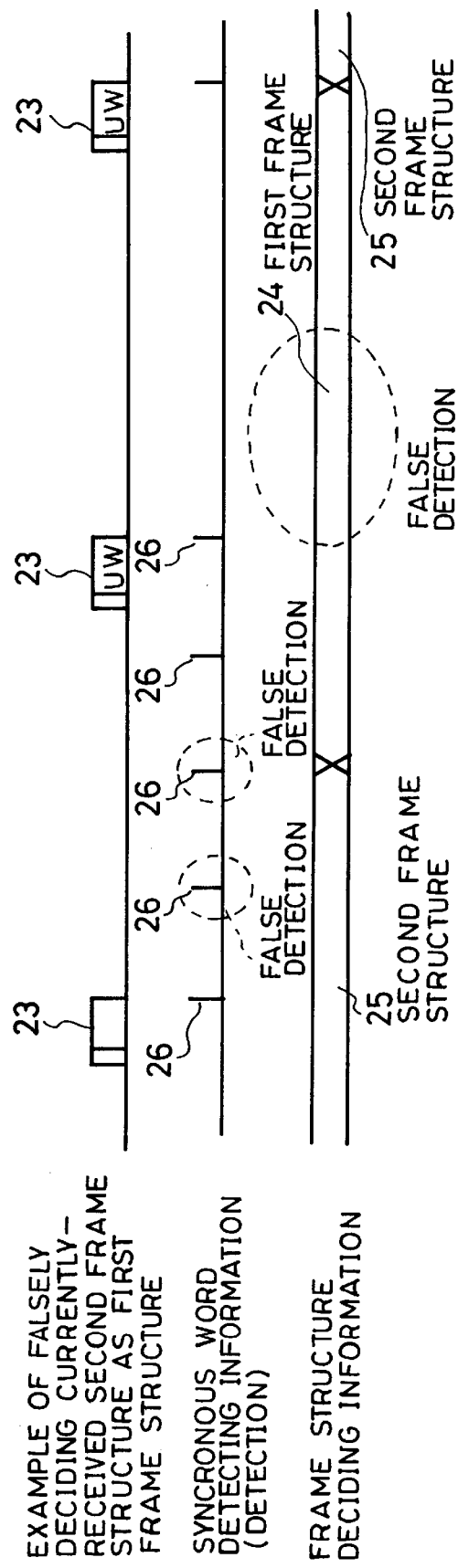
FIG. 7 is an illustration showing a case of falsely detecting a second frame structure of the above conventional receiver as a first frame structure of the receiver.
Figure 9:
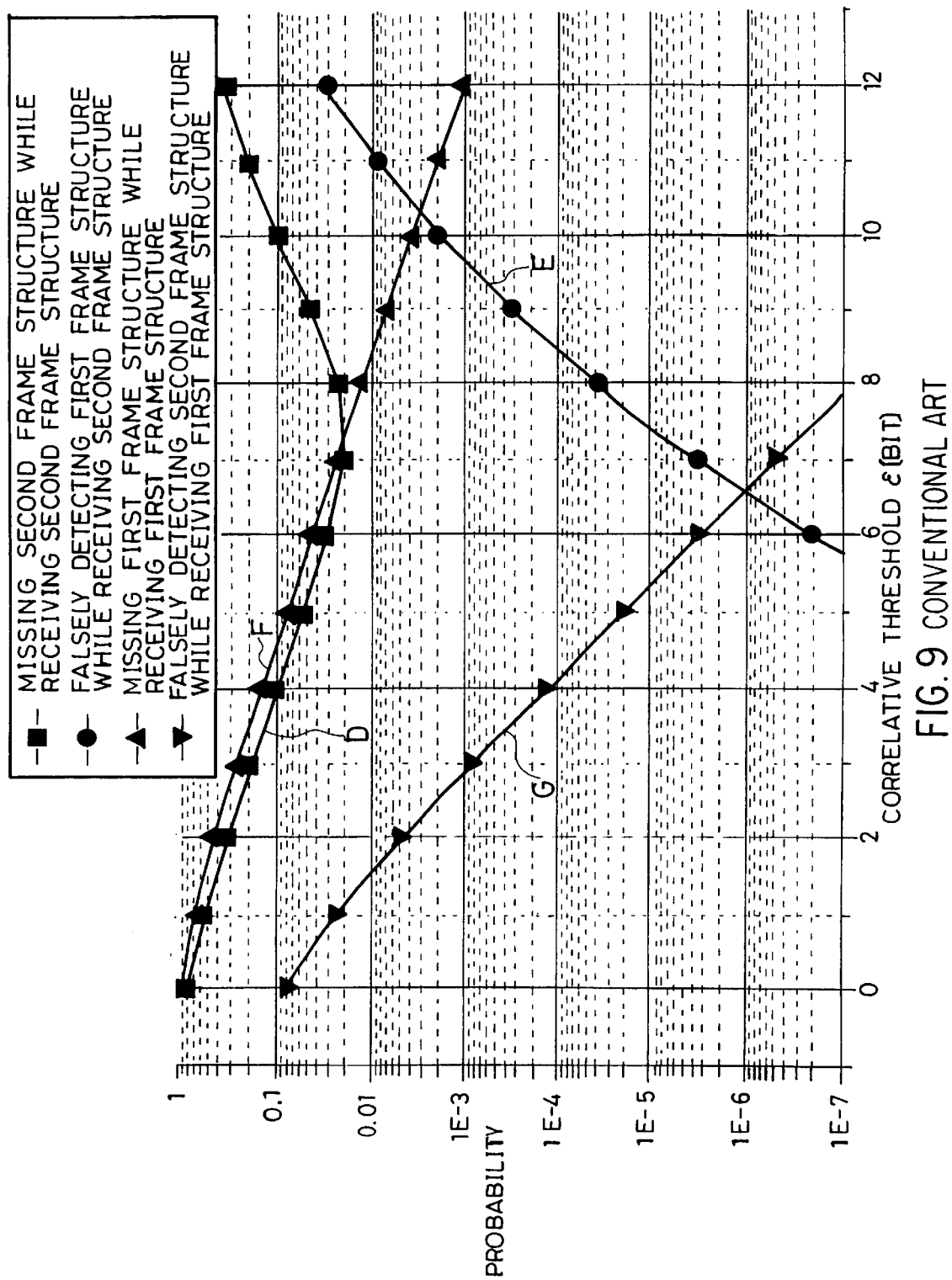
FIG. 9 is a graph prepared in accordance with the values in FIG. 8.

FIG. 1 is a block diagram showing the structure of the digital radio communication receiver of the embodiment 1 of the present invention. In FIG. 1, the structure is characterized in that a frame-synchronization detection decision result is independent of a frame-structure detection decision result by using a frame-synchronization synchronous-word detecting section 1 and a frame-structure synchronous-word detecting section 11 instead of the synchronous word detecting section 1' shown in FIG. 4 and using a frame-synchronization correlative-threshold setting section 7 and a frame-structure correlative-threshold setting section 10 instead of the correlative threshold setting section 7' shown in FIG. 4. An aperture control section 2, timing control section 3, number-of-frame-synchronization-protection-stage setting section 4, frame synchronization deciding section 5, aperture width setting section 6, received signal extracting section 6, frame structure deciding section 9, antenna 100, down-converter 101, and wave detector 102 are the same as conventional ones and therefore, their illustrations are omitted from FIG. 1.

Then, operations of the embodiment 1 are described below. A received bit series output from a wave detector 102 (see FIG. 4) is input to the frame-synchronization synchronous-word detecting section 1 and frame-structure synchronous-word detecting section 11. The frame-synchronization synchronous-word detecting section 1 takes the correlation between received bit series and synchronous words in accordance with the timing information sent from the aperture control section 2 (see FIG. 4), decides a detected/missed synchronous word and a phase in accordance with the above correlative value and a frame-synchronization correlative value sent from the frame-synchronization correlative-value setting section 7, and outputs the decision result to the frame-synchronization deciding section 5 as frame-synchronization synchronous-word detecting information. The frame-synchronization deciding section 5 decides a frame synchronization state when continuously detecting synchronous words by the number of stages specified by (the number of backward protection stages of) the number of frame-synchronization protection stages (at subframe intervals) to shift from a frame step-out state to a frame synchronization state and inversely, decides a frame step-out state when continuously detecting synchronous words by the number of stages specified by (the number of forward protection stages of) the number of frame-synchronization protection stages to shift from the frame synchronization state to the frame step-out state. (at subframe intervals). Synchronization detection and miss information is the frame-synchronization synchronous-word information obtained from the frame-synchronization synchronous-word detector 1.

The frame-structure synchronous-word detecting section 11 takes the correlation between received bit series and synchronous words in accordance with the timing information supplied from the aperture control section 2, decides a detected/missed synchronous word and a phase and outputs the decision results to the frame structure deciding section 9 as frame-structure synchronous-word detecting information. That is, the frame-structure synchronous word detecting section 11 decides a case in which a correlative value does not exceed a frame-structure correlative threshold as detection of a synchronous word and decides a case in which a correlative value exceeds a frame-structure correlative threshold as miss of a synchronous word. The frame structure deciding section 9 is set to a second-frame-structure deciding state when continuously deciding second frame structures by the number of stages specified by (the number of first-frame-structure protection stages of) the number of frame-structure protection stages (at subframe intervals) to shift from a first frame structure deciding state to a second frame structure deciding state. For example, in the case of a second structure, when the number of protection stages is 5, the section 9 is set to the second frame-structure deciding state after detecting a synchronous word, missing a synchronous word, missing a synchronous word, and detecting a synchronous word. A combination of detection with miss depends on a frame structure. However, to shift from the second frame structure deciding state to the first frame structure deciding state, the section 9 is set to the first frame structure deciding state when continuously deciding first frame structures by the number of stages specified by (the number of second frame structure protection stages of) the number of frame structure protection stages (at subframe intervals). For example, in the case of the first frame structure, when the number of protection stages is 3, the section 9 is set to the first frame structure deciding state after detecting a synchronous word, detecting a synchronous word, and detecting a synchronous word. Synchronous word detection and miss information is the frame-synchronization synchronous-word information obtained from the frame-synchronization synchronous-word detecting section 1.

In the case of the embodiment 1, it is possible to use a different value as a frame-synchronization correlative threshold and a frame-structure correlative threshold respectively. Therefore, when setting the frame-synchronization correlative threshold to 6 and the frame-structure correlative threshold to 7 similarly to the case of the conventional example, the probability of not deciding a second frame structure as a second frame structure is $2.01 \times 10^{-2}$ and therefore, the probability of correctly deciding a second frame structure is high.

In the case of the above conventional example, however, because a frame-synchronization and frame-structure thresholds use the same value, the probability of not deciding a second frame structure as a second frame structure is $3.06 \times 10^{-2}$ when assuming a correlative value as 6.

Moreover, because the frame synchronization probability is the same for the conventional example and the embodiment 1 because they use the same correlative value.

The above probability "$2.01 \times 10^{-2}$" of not deciding a second frame structure is a value obtained by "missing ch" "while receiving ch" when "$\epsilon=7$" in FIG. 8. The formula for calculating the value is shown below.

$$1-\{(1-p)^2(1-f)^4+p^2f^2(1-f)^2+2pf^2(1-f)^3\}$$

Figure 2:
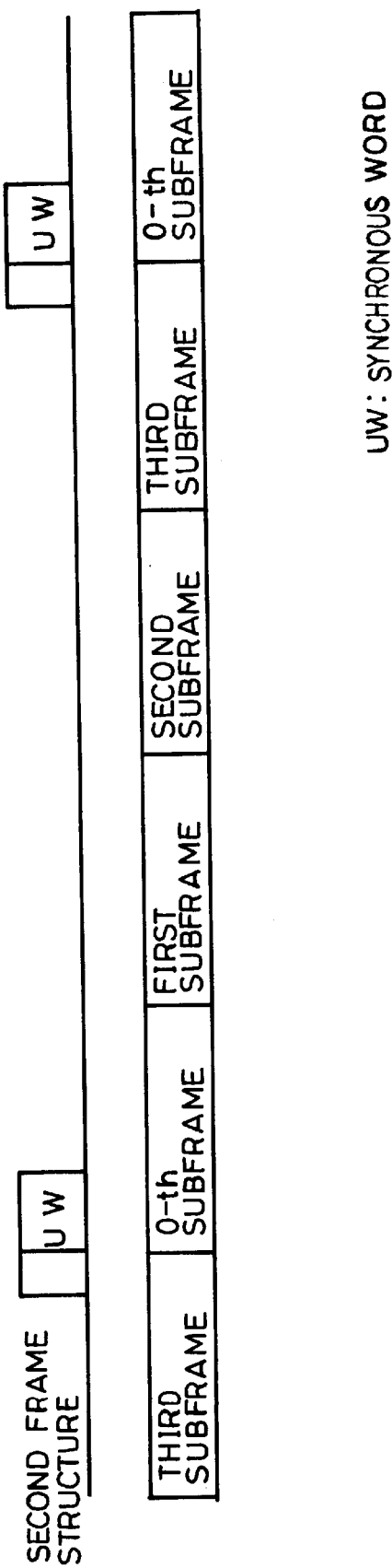
FIG. 2 is an illustration showing the second frame structure of the embodiment 1 of the present invention.

Where,

1-{ }: Probability of not deciding second frame structure in any one of first to third subframes First term in { }: Probability of deciding second frame structure in 0th subframe Second term in { }: Probability of deciding second frame structure in first subframe Third term in { }: Probability of deciding second frame structure in second and third subframes p: Probability of missed synchronous words f: Probability of falsely-detected synchronous words Therefore, a synchronous word is inserted into the 0th subframe as shown in FIG. 2 in the case of the second subframe structure and a frame structure into which no synchronous word is inserted is formed in the case of the first to third subframes.

Therefore, the embodiment 1 makes it possible to lower the probability of miss frame structures or falsely-detected frame structures and improve the probability of correcting recognizing frame structures while keeping an frame-synchronization probability optimum.

In short, according to the embodiment 1, it is possible to divide a synchronous word detecting section into the frame-synchronization synchronous-word detecting section 1 and the frame-structure synchronous-word detecting section 11 and set correlative thresholds by the frame-synchronization correlative-value setting section 7 and frame-structure correlative-threshold setting section 10 so as to be different from each other. Therefore, an advantage is obtained that it is possible to improve a probability of correctly recognizing frame structures while keeping a frame-synchronization probability optimum.

Moreover, the embodiment 1 makes it possible to use a synchronous word detected by the frame-synchronization synchronous-word detecting section 1 or frame-structure synchronous-word detecting section 11 directly as deciding information. However, when using the synchronous word directly, the detecting information is directly influenced by false detection or miss of a synchronous word because there is no protection state. Therefore, the characteristic of the decision result of a frame synchronization decision state or frame-structure decision state may be deteriorated or an optimum value may be obtained in accordance with no protection state (=one protection stage) depending on the circuit state. To improve the above trouble, the frame synchronization deciding section 5 and frame structure deciding section 9 are used.

Moreover, the frame-synchronization deciding information obtained by the frame synchronization deciding section 5 of the embodiment 1 can be effectively used at the rear stage of a circuit as shown below. The demodulating section by using frame structure deciding information. That is, because every subframe carrier is present in the first frame structure, it can be effectively used as the information for reproducing timing at any timing. However, because every subframe carrier is absent in the second frame structure, it can be used as the information for reproducing timing only at a specified position where a carrier such as a synchronous word is present.

Furthermore, the frame structure deciding information obtained by the frame structure deciding section 9 of the embodiment 1 can be effectively used as shown below. For example, it is possible to decide a circuit supplementary state at a high-order layer by using frame structure deciding information. For example, when frame synchronization is not effected for 20 sec, a circuit is disconnected.

Embodiment 2

Figure 3:
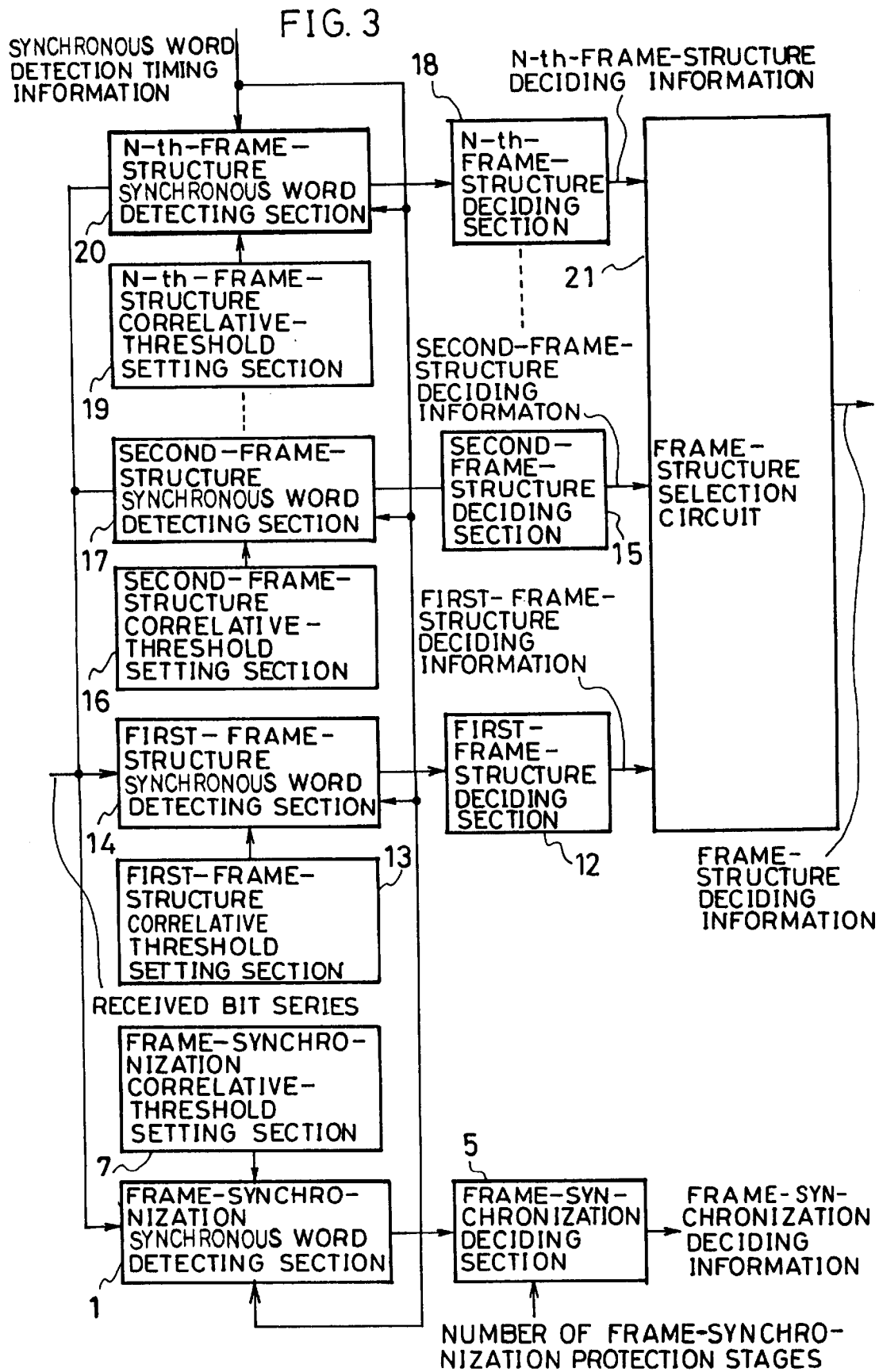
FIG. 3 is a block diagram showing embodiment 2 of the present invention.

FIG. 3 is a block diagram showing the structure of the digital radio communication receiver of the embodiment 2 of the present invention. The embodiment 2 is characterized by fractionating first frame structure to Nth frame structure up to each frame structure unit so as to extract a frame structure estimated to be most correct out of the frame structures.

That is, in FIG. 3, the first-frame-structure synchronous-word detecting section 14, second-frame-structure synchronous-word detecting section 17, and Nth-frame-structure detecting section 20 are used instead of the frame-structure synchronous word detecting section 10 in FIG. 1, the first frame-structure correlative-threshold setting section 13, second-frame-structure correlative-threshold setting section 16, and Nth-frame-structure correlative-threshold setting section 19 are used instead of the frame-structure correlative-threshold setting section 10 in FIG. 1, the first frame structure deciding section 12, second frame structure deciding section 15, and Nth frame structure deciding section 18 are used instead of the frame structure deciding section 9 in FIG. 1, and a frame structure selection circuit 21 for inputting first to Nth frame structure deciding information output from the first to Nth frame structure deciding sections 12, 15, and 18.

Then, operations of the embodiment 2 are described below in detail. A received bit series output from a wave detector 102 (see FIG. 4) is input to the frame-synchronization synchronous-word detecting section 1 and the first- to Nth-frame-structure synchronous-word detecting sections 14, 17, and 20 respectively. The first to Nth frame-structure synchronous-word detecting sections 14, 17, and 20 respectively takes the correlation between received bit series and synchronous word in accordance with the timing information sent from an aperture control section (see FIG. 4), respectively decide detection/miss of a synchronous words and phases in accordance with the above correlative threshold values and the first- to Nth-frame-structure correlative threshold values sent from the first- to Nth-frame structure correlative threshold value setting sections 13, 16, and 19, and respectively output the decision results to the first- to Nth frame structure deciding sections 12, 15, and 18 as first- to Nth-frame-structure synchronous-word detecting information. The first to Nth frame structure deciding section 12, 15, and 18 respectively decide first to Nth frame structures in accordance with the frame-structure synchronous-word detecting information and output the decision results to the frame structure selection circuit 21 as first to Nth frame structure deciding information.

The frame structure selection circuit 21 decides whether a frame structure is a present frame structure in accordance with the first to Nth frame structure deciding information and outputs the decision result as frame structure information. The frame structure selection circuit 21 previously stores the probability of correctly deciding the first to Nth frame structures in accordance with a set correlative threshold value. Moreover, if only one frame structure is detected by the first frame structure deciding section 14 and second frame structure deciding section 17, the frame structure selection circuit 21 uses the detection result. When two frame structures or more are simultaneously detected by the first frame structure deciding section 14 and second frame structure deciding section 17, a frame structure estimated to be most correct is decided and extracted out of two frame structures or more detected by using the probability stored in the frame structure selection circuit 21. For example, when assuming that the first-frame-structure threshold value is set to 10 and the second-frame-structure threshold value is set to 7, the probability that the first frame structure is correctly detected is $1-3.69 \times 10^{-3}$ (see FIG. 8) and the probability that the second frame structure is correctly detected is $1-2.01 \times 10^{-2}$ (see FIG. 8). By comparing these values, the frame structure selection circuit 21 selects the first frame structure as. a frame structure because the probability that the first frame structure is correctly detected is higher.

In the case of the embodiment 2, the probability of not deciding the first frame structure as a first frame structure is $3.69 \times 10^{-3}$ when setting a frame-synchronization correlative threshold to 6 same as the case of the conventional example, a frame-structure correlative threshold to 10, and a second frame-structure correlative threshold to 7. When using the threshold=7 of the embodiment 1, the probability of not deciding the first frame structure as a first frame structure is $2.38 \times 10^{-2}$. Therefore, it is found that the embodiment 2 has a high probability of correctly deciding the first frame structure compared to the case of the embodiment 1. Moreover, the conventional example and the embodiment 1 have the same frame synchronization probability and the same probability of missing the second frame structure because they uses the same correlative threshold.

Therefore, the embodiment 2 makes it possible to lower the probability of missed frame structures or the probability of erroneously detected frame structures while keeping a frame synchronization probability optimum compared to the case of the embodiment 1 and improve the probability of correctly recognizing frame structures.

As described above, the inventions of claims 1 to 3 and claim 7 separately detect a frame-synchronization synchronous word and a frame-structure synchronous word from the same received bit series, decide a frame synchronization state in accordance with the frame-synchronization synchronous word, and decide a frame structure in accordance with the frame-structure synchronous word. Therefore, there is an advantage of improving the frame-synchronization and frame-structure deciding probabilities.

The inventions of claims 4 to 6 and claim 8 separately detect a plurality of different types of frame-structure synchronous words from the same received bit series for each type and decide a plurality of different types of frame structures in accordance with these frame-structure synchronous words. Therefore, there is an advantage of improving the probability of correctly recognizing frame structure decision while keeping a frame synchronization probability optimum.

What is claimed is:

1. A reception method for a digital radio communication system, comprising the steps of directly detecting a frame-synchronization synchronous word from a received bit series, directly detecting a frame-structure synchronous word from said received bit series simultaneously with detecting of said frame-synchronization synchronous word, deciding a frame synchronous state in accordance with the frame-synchronization synchronous word, deciding a frame structure in accordance with the frame-structure synchronous word, and outputting each decision result.

2. The reception method for a digital radio communication system according to claim 1, wherein the frame-synchronization synchronous word and the frame-structure synchronous word are detected by correlative thresholds set to values different from each other.

3. The reception method for a digital radio communication system according to claim 1, wherein the frame-synchronization synchronous word is detected in accordance with a number of frame-synchronization protection stages.

4. A receiver for a digital radio communication system having two types of frame structures, comprising:

frame-synchronization synchronous word detecting means for detecting a frame-synchronization synchronous word from a received bit series;

first frame-structure synchronous word detecting means for detecting a first frame-structure synchronous word using said received bit series;

frame-synchronization deciding correlative-threshold setting means for setting a first correlative threshold used for decision of the frame-synchronization synchronous word;

first frame-structure deciding correlative-threshold setting means for setting a second correlative threshold used for decision of the first frame-structure synchronous word;

frame-synchronization deciding means for deciding whether to establish a received frame in accordance with said detected frame-synchronization synchronous word and a number of frame-synchronization protection stages and outputting the decision result as frame-synchronization information; and first frame-structure deciding means for deciding a first frame-structure of a received frame in accordance with said detected first frame-structure synchronous-word and outputting the decision result as first frame structure information.

5. The receiver for a digital radio communication system according to claim 4, further comprising Nth frame-structure synchronous word detecting means for detecting not only the first frame-structure synchronous word but also up to an Nth frame-structure synchronous word and Nth frame-structure deciding means for deciding not only the first frame-structure but also up to an Nth frame-structure.

* * * * *